United States Patent
Suzuki

(10) Patent No.: US 12,523,622 B2
(45) Date of Patent: Jan. 13, 2026

(54) X-RAY ANALYZER WITH MOVABLE SLIT BETWEEN SAMPLE AND ANALYZING CRYSTAL

(71) Applicant: SHIMADZU CORPORATION, Kyoto (JP)

(72) Inventor: Keijiro Suzuki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 176 days.

(21) Appl. No.: 18/624,261

(22) Filed: Apr. 2, 2024

(65) Prior Publication Data
US 2024/0361261 A1  Oct. 31, 2024

(30) Foreign Application Priority Data
Apr. 28, 2023  (JP) ................................. 2023-074341

(51) Int. Cl.
*G01N 23/207* (2018.01)
*G01N 23/223* (2006.01)

(52) U.S. Cl.
CPC ....... *G01N 23/2076* (2013.01); *G01N 23/223* (2013.01); *G01N 2223/0563* (2013.01); *G01N 2223/076* (2013.01)

(58) Field of Classification Search
CPC ............. G01N 23/2076; G01N 23/223; G01N 2223/0563; G01N 2223/076; G01N 23/2209; G01N 2223/079; G01N 2223/1016; G01N 2223/102
See application file for complete search history.

(56) References Cited

U.S. PATENT DOCUMENTS

2006/0153332 A1* 7/2006 Kohno ..................... G21K 1/06
378/82
2021/0369220 A1* 12/2021 Sato ..................... A61B 6/4291

FOREIGN PATENT DOCUMENTS

JP          6142135 B    6/2017
JP       2017223638 A   12/2017

OTHER PUBLICATIONS

X specia (c142-3141) Mar. 2020 URL: https://www.an.shimadzu.co.jp/sites/an.shimadzu.co.jp/files/pim/pim_document_file/an_jp/brochures/20721/c142-3141.pdf.

* cited by examiner

*Primary Examiner* — Casey Bryant
*Assistant Examiner* — William Laurence Taylor
(74) *Attorney, Agent, or Firm* — Muir Patent Law, PLLC

(57) ABSTRACT

An X-ray analyzer is provided with an excitation source configured to irradiate a sample with an excitation beam, an analyzing crystal configured to diffract characteristic X-rays emitted from the sample irradiated with the excitation beam for each wavelength, a line detector having a plurality of detection elements each arranged to detect an intensity of each of the plurality of wavelengths diffracted by the analyzing crystal, a slit arranged between the sample and the analyzing crystal, an actuator configured to move the slit in a direction intersecting a propagation direction of the characteristic X-rays passing through the slit, and a controller. The controller analyzes the sample using a measurement result when the slit is in an initial position and a measurement result when the slit has been moved from the initial position by a predetermined amount.

6 Claims, 6 Drawing Sheets

First measurement

Second measurement

X-RAY ANALYZER WITH MOVABLE SLIT BETWEEN SAMPLE AND ANALYZING CRYSTAL

CROSS-REFERENCE TO RELATED APPLICATIONS

This application claims priority under 35 U.S.C. § 119 to Japanese Patent Application No. 2023-074341 filed on Apr. 28, 2023, the entire disclosure of which is incorporated herein by reference in its entirety.

BACKGROUND OF THE INVENTION

Field of the Invention

The present disclosure relates to an X-ray analyzer.

Description of the Related Art

The following description sets forth the inventor's knowledge of the related art and problems therein and should not be construed as an admission of knowledge in the prior art.

The characteristic X-rays (fluorescent X-rays) emitted by a sample irradiated with an excitation beam have wavelengths determined by the elements contained in the sample. Therefore, the composition of the sample can be determined by detecting the intensity of the characteristic X-ray at each wavelength. This method of detecting characteristic X-rays by measuring the intensity at each wavelength is called "wavelength dispersive."

As one example of a wavelength-dispersive X-ray analyzer, Japanese Unexamined Patent Application Publication No. 2017-223638 discloses an X-ray analyzer that can measure the composition of a sample with high sensitivity by a spectroscopy method. In this X-ray analyzer, an excitation source irradiates a sample with an excitation beam, and the sample irradiated with the excitation beam generates characteristic X-rays. The generated characteristic X-rays pass through a slit and reach an analyzing crystal. As the characteristic X-rays pass through this slit, the incident angle of the characteristic X-rays on the analyzing crystal varies depending on the generation position of the characteristic X-rays on the sample. The characteristic X-rays diffracted by the analyzing crystal reach a detector.

The detector is composed of a plurality of detection elements arranged in a predetermined direction, and each of the plurality of detection elements detects the intensity of characteristic X-rays (hereinafter also referred to as "characteristic X-ray intensities") different in wavelength (energy) in accordance with the incident angles of the characteristic X-rays to the analyzing crystal. The X-ray analyzer generates an X-ray spectrum based on the X-ray intensity corresponding to the energy detected at each of the plurality of detection elements. And, the X-ray analyzer analyzes the sample based on the X-ray spectrum.

In the above-described X-ray analyzer, a more accurate characteristic X-ray spectrum by increasing the number of measurement points has been desired to obtain. To achieve this, it is necessary to reduce the detection element pitch. For example, it is conceivable to reduce the pitch between adjacent detection elements by shortening the width of each detection element to downsize each detection element. However, in order to reduce the width of the detection element, it is necessary to achieve higher dimensional accuracy in the detection element manufacturing stage. Therefore, it is expected that the miniaturization of detection elements becomes difficult due to manufacturing limitations and manufacturing costs.

SUMMARY OF THE INVENTION

The present disclosure has been made to solve the above-described problems, and the purpose of the present disclosure is to provide an X-ray analyzer capable of improving the analysis accuracy of a sample without downsizing a detection element.

An X-ray analyzer according to the present disclosure includes:
- an excitation source configured to irradiate a sample with an excitation beam;
- an analyzing crystal configured to diffract characteristic X-rays emitted from the sample irradiated with the excitation beam for each wavelength;
- a line detector having a plurality of detection elements each arranged to detect an intensity of each of a plurality of wavelengths diffracted by the analyzing crystal;
- a slit arranged between the sample and the analyzing crystal;
- a drive unit configured to move the slit in a direction intersecting a propagation direction of the characteristic X-rays passing through the slit; and
- a controller,
- wherein the controller analyzes the sample using a first measurement result which is a measurement result of the line detector when the slit is in a first position and a second measurement result which is a measurement result of the line detector when the slit has been moved from the first position by the driving device and is in a second position.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

Some preferred embodiments of the present disclosure are shown by way of example, and not limitation, in the accompanying figures.

DETAILED DESCRIPTION OF THE PREFERRED EMBODIMENTS

In the following paragraphs, some preferred embodiments of the present disclosure will be described by way of example and not limitation. It should be understood based on this disclosure that various other modifications can be made by those skilled in the art based on these illustrated embodiments.

Hereinafter, some embodiments of the present disclosure will be described with reference to the attached drawings. Note that, hereinafter, the same or equivalent part in the figures is assigned by the same reference symbol, and the description thereof will not be repeated.

[Configuration of X-Ray Analyzer]

Figure 1:
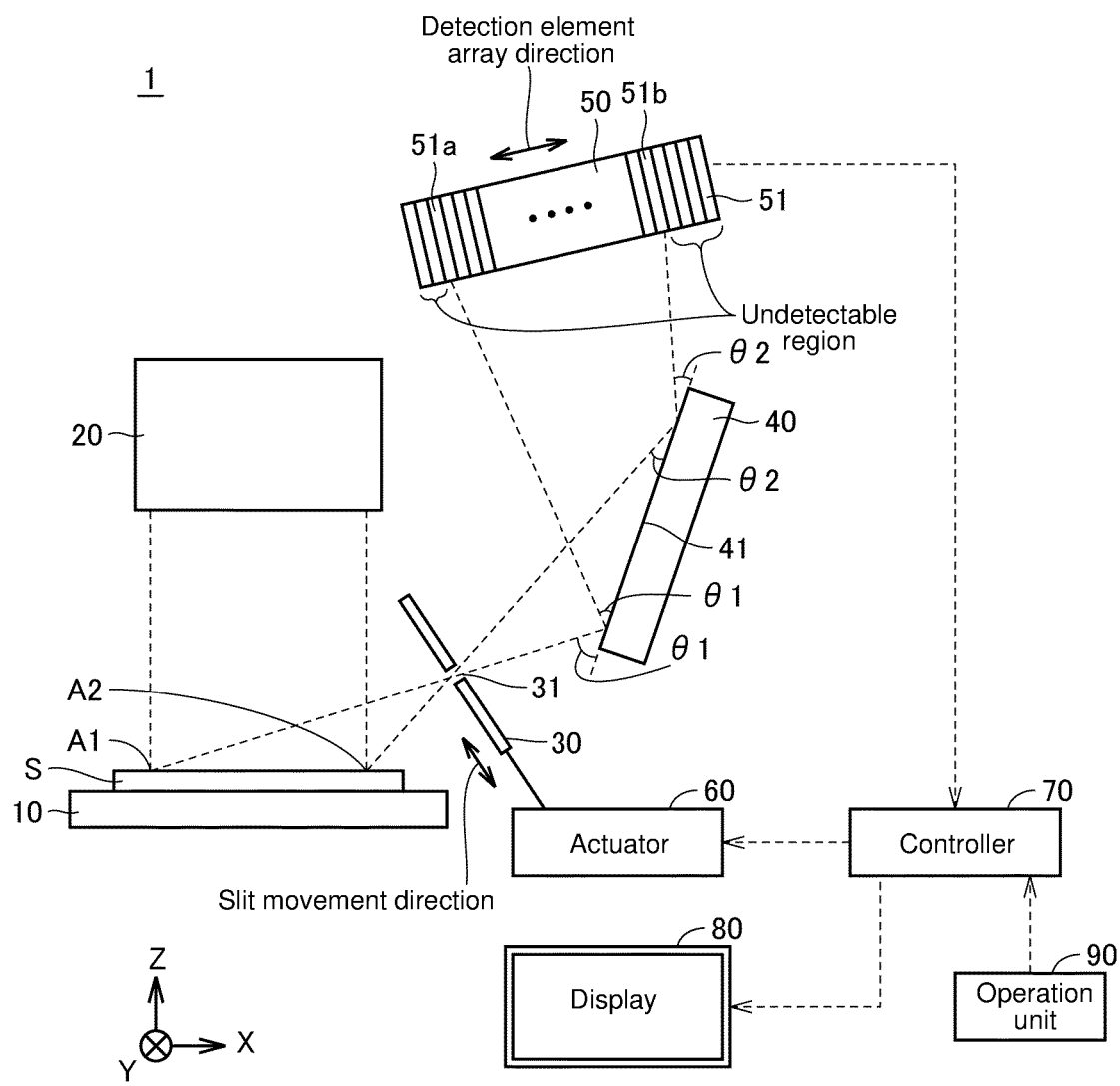
FIG. 1 is a diagram schematically showing the configuration of an X-ray analyzer.

FIG. 1 is a diagram schematically showing the configuration of an X-ray analyzer 1. The X-ray analyzer 1 is a so-called wavelength-dispersive X-ray analyzer that detects a characteristic X-ray spectrum by measuring the characteristic X-ray intensity at each desired wavelength by diffracting the characteristic X-rays with a spectrometer (analyzing crystal).

The X-ray analyzer 1 is equipped with a holder 10 for holding a sample S to be analyzed, an excitation source 20, a slit 30, an analyzing crystal 40, a line detector (Position Sensitive Detector) 50, an actuator 60, a controller 70, a display 80, and an operation unit 90.

The excitation source 20 is an X-ray source that irradiates the sample S with X-rays, which are excitation light (excitation beam). An electron beam source may be used instead of the X-ray source. In FIG. 1, the plane on which the sample S is held on the holder 10 is defined as an X-Y plane, and the normal direction of the X-Y plane is defined as a Z-axis direction. The sample S can be any one of solid, liquid, or gas, and a sample holder 10 corresponding to the state of the sample S is used.

The excitation light emitted from the excitation source 20 is emitted onto the surface of the sample S. This causes characteristic X-rays to be emitted from the sample S. In the example shown in FIG. 1, it is configured such that the surface of the sample S is irradiated with the excitation light perpendicularly to the surface of the sample S. However, it can be configured such that the excitation light is emitted at an angle inclined to the surface of the sample S.

A slit 30 is placed between the sample S and the analyzing crystal 40. The slit 30 has a linear opening 31 extending in the Y-axis direction. The characteristic X-rays emitted from the sample S pass through the linear opening 31 of the slit 30 to reach the analyzing crystal. As the characteristic X-rays pass through this slit 30, the incident angle of the characteristic X-rays on the analyzing crystal 40 varies depending on the generation position of the characteristic X-rays on the sample S.

The analyzing crystal 40 is composed of, for example, a silicon single-crystal, a lithium fluoride single-crystal, or a germanium single-crystal. In the analyzing crystal 40, specific crystal planes are parallel to the surface of the crystal. It is possible to use only the specific crystal planes for detecting characteristic X-rays, which makes it possible to prevent accidental detection of the characteristic X-rays Bragg-reflected by other crystal planes.

The line detector 50 has a plurality (e.g., 1,000 or more) of detection elements 51 arranged along a predetermined array direction. Each detection element 51 is made of, for example, silicon, and is configured to detect the intensity of the characteristic X-ray that has been diffracted by the analyzing crystal 40. The line detector 50 outputs the detection result by each detection element 51 to the controller 70.

In the state in which the sample S is held by the holder 10, when the surface of the sample S is irradiated with the excitation beam from the excitation source 20, characteristic X-rays are emitted from the sample S. The emitted characteristic X-rays have wavelengths that differ depending on the element constituting the sample S. The characteristic X-rays emitted when the region from the position A1 to the position A2 is irradiated with the excitation beam, which is emitted from the excitation source 20, pass through the slit 30 and reach the surface 41 of the analyzing crystal 40. In FIG. 1, the characteristic X-rays occurring at the positions A1 and A2 are shown as dashed lines. The position A2 is a position away from the position A1 by a predetermined distance in the positive direction of the X-axis. Note that the irradiation region at the position A1 and the irradiation region at the position A2 both extend in the Y-axis direction.

When the angle between the characteristic X-rays incident on the analyzing crystal 40 and the surface 41 of the analyzing crystal 40 is $\theta$, the incident angle of the characteristic X-rays is $(90-\theta)$ degrees. The incident angle of the characteristic X-rays to the analyzing crystal 40 differs depending on the generation position of the characteristic X-rays on the sample S by having the characteristic X-rays pass through the slit 30. For example, the characteristic X-rays emitted at the position A1 enter the analyzing crystal 40 at the incident angle of $(90-\theta 1)$ degrees, and the characteristic X-rays emitted at the position A2 enter the analyzing crystal 40 at the incident angle of $(90-\theta 2)$ degrees.

Of the characteristic X-rays entering the analyzing crystal 40 from the sample S at the incident angle $(90-\theta)$ degrees, only the characteristic X-ray with a wavelength satisfying the Bragg condition formula $\lambda=(2d/n) \sin \theta$ (where $\lambda$ is the wavelength of the characteristic X-rays, d is the interplanar spacing of the analyzing crystal 40, and n is the order) is diffracted by the analyzing crystal 40 and reaches the line detector 50. In the case where the slit 30, the analyzing crystal 40, and the line detector 50 are fixed in the state shown in FIG. 1, a characteristic X-ray with a wavelength satisfying the equation of the Bragg's diffraction condition within the range $\theta 2 < \theta < \theta 1$ is diffracted by the analyzing crystal 40 and reaches the line detector 50.

Since the characteristic X-ray diffracted by the analyzing crystal 40 is emitted at the same angle as the incident angle, the Bragg-reflected characteristic X-ray is detected by the detection element 51 located at a position corresponding to the outgoing angle, out of the plurality of detection elements 51. For example, in the state shown in FIG. 1, the characteristic X-ray emitted from the position A1 satisfying the wavelength $\lambda 1=(2d/n) \sin \theta 1$ is detected by the detection element 51a. Further, among the characteristic X-rays emitted from position A2, the characteristic X-ray satisfying the wavelength $\lambda 2=(2d/n) \sin \theta 2$ is detected by the detection element 51b. Note that as shown in FIG. 1, there are characteristic X-ray undetectable regions at both ends of the line detector 50. In other words, the line detector 50 can measure the intensities of characteristic X-rays measured by the detection elements 51 arranged between the detection element 51a and the detection element 51b.

Thus, the characteristic X-rays different in wavelength for each of a plurality of detection elements 51 are detected. In other words, the X-ray analyzer 1 can recognize the wavelengths contained in the characteristic X-rays by knowing the detection elements that have detected the characteristic X-rays. On the other hand, the wavelength of the characteristic X-ray differs for each element. Thus, the X-ray analyzer 1 can perform the analysis of the sample (e.g., identify the elements contained in the sample) by identifying the detection element that has detected the characteristic X-ray in the detector 50.

The controller 70 includes a CPU (Central Processing Unit), a memory (memory device), an input/output buffer, etc., and performs processing such as the analysis of the sample S using the detection results of the line detector 50. Note that the processing performed by the controller 70 is not limited to software processing but can also be performed by dedicated hardware (electronic circuits).

The controller 70 can generate a characteristic X-ray spectrum showing the correspondence relation between the wavelength (energy) and the intensity of the characteristic X-rays emitted from the sample S, using the detection results of the line detector 50. The controller 70 then analyzes the sample S (e.g., identifies the contained elements of the sample) by comparing the generated characteristic X-ray spectrum with the characteristic X-ray spectrum of a known sample.

The controller 70 can cause the display 80 to display the X-ray spectrum, which is generated based on the detection results of the line detector 50, and the analysis results of the sample S based on the X-ray spectrum. The display 80 is configured by a liquid crystal panel or the like capable of displaying an image. The operation unit 90 receives operational inputs from the user for the X-ray analyzer 1. The operation unit 90 is typically configured by a touch panel, a keyboard, a mouse, or the like.

[Improvement of Sample Analysis Accuracy by Movement of Slit 30]

To improve the sample analysis accuracy by the X-ray analyzer 1, it is desirable to improve the peak fitting accuracy of the characteristic X-ray intensity. To improve the peak fitting accuracy of the characteristic X-ray intensity, the measurement pitch of the wavelengths (energies) in the characteristic X-ray spectrum is preferably made finer.

As one technique to make the wavelength measurement pitch finer, it is conceivable to make the width W (the dimension in the array direction) of each detection element 51 in the line detector 50 smaller to increase the array density of the detection elements 51. However, the width W of the detection element 51 is already a very small value (e.g., about 50 μm), and further reducing the width W of the detection element 51 requires very high dimensional accuracy, which is technically difficult. Therefore, it is difficult to easily increase the array density of the detection elements 51.

As another technique to make the wavelength measurement pitch finer, it is conceivable to increase the distance from the sample S to the analyzing crystal 40 or the distance from the analyzing crystal 40 to the line detector 50. However, this approach has a problem of increasing the size of the X-ray analyzer 1. Another problem is that the X-ray intensity attenuates in proportion to the square of the distance, so the intensity of X-rays detected by the line detector 50 becomes very small. In addition, there also is a problem in that the wavelength range in which the line detector 50 can measure becomes narrow.

In view of these problems, the X-ray analyzer 1 according to this embodiment is provided with an actuator 60 for moving the slit 30, which is placed between the sample S and the analyzing crystal 40, in a direction that intersects the direction of the characteristic X-rays (the direction in which the characteristic X-rays pass through the slit 30). The controller 70 causes the slit 30 to move by a predetermined amount (hereinafter referred to as "slit movement amount") ΔD in in a direction intersecting a propagation direction of the characteristic X-rays passing through the slit 30 (hereinafter referred to as "slit movement direction") when conducting the sample analysis. This causes characteristic X-rays with different wavelengths to enter each of the plurality of detection elements 51 before and after the movement of the slit 30. As a result, it is possible to achieve a finer measurement pitch in the characteristic X-ray spectrum in a pseudo manner.

Specifically, the controller 70 causes the line detector 50 to perform the first-time measurement (first measurement) when the slit 30 is in the initial position (first position) and stores the first measurement in a memory. Thereafter, the controller 70 causes the slit 30 to move by a slit movement amount ΔD in the slit movement direction and cause the line detector 50 to perform a second-time measurement (second measurement) when the slit 30 is in the position (second position) after the movement. Then, the controller 70 generates a spectrum of characteristic X-rays to be used for the analysis of the sample S by synthesizing the first measurement result and the second measurement result.

Figure 2:
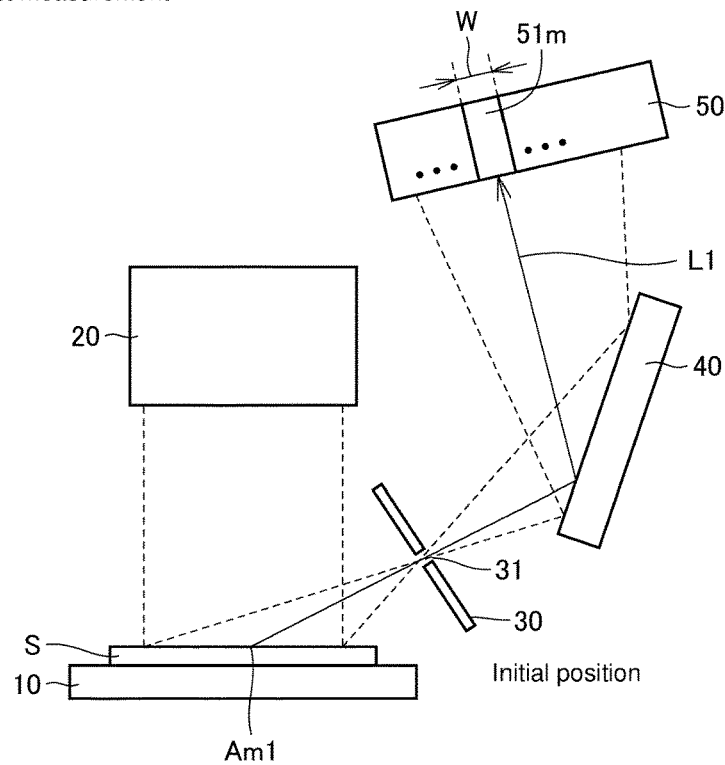
FIG. 2 shows the state of the X-ray analyzer at the time of a first measurement.

FIG. 2 shows the state of the X-ray analyzer 1 at the time of the first measurement. At the time of the first measurement, the slit 30 is in the initial position. FIG. 2 shows an example of the transmission path of the characteristic X-rays L1 detected by one detection element 51m at the time of the first measurement. The characteristic X-rays L1 are emitted from the position Am1 of the sample, pass through the slit 30, and are diffracted by the analyzing crystal 40 to reach the detection element 51m.

Figure 3:
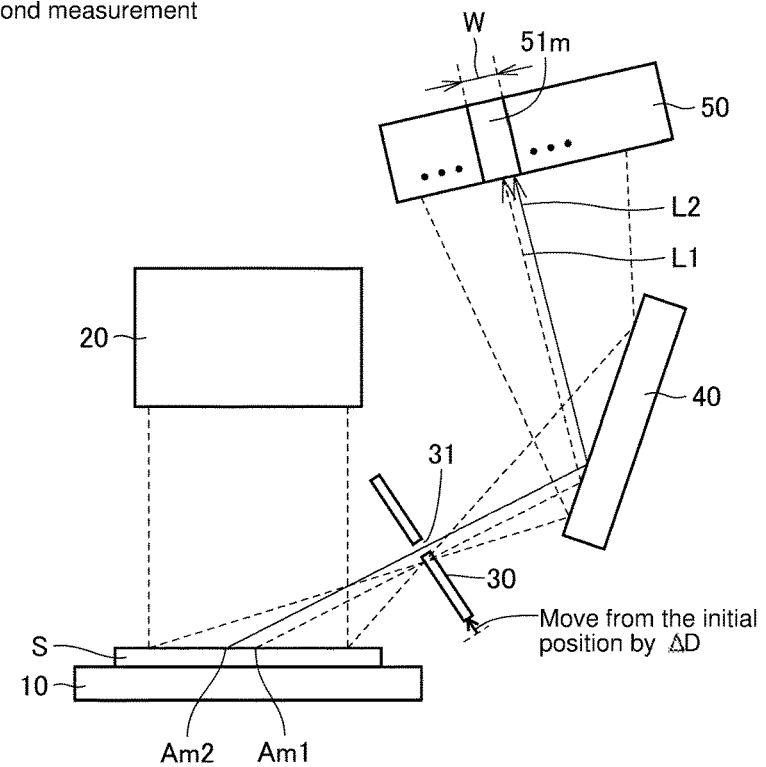
FIG. 3 shows the state of the X-ray analyzer at the time of a second measurement.

FIG. 3 shows the state of the X-ray analyzer 1 at the time of the second measurement. At the time of the second measurement, the slit 30 is in a position where the slit has been moved from the initial position by a slit movement amount ΔD in the slit movement direction. FIG. 3 shows an example of the transmission path of the characteristic X-rays L2 detected by the detection element 51m at the time of the second measurement.

The characteristic X-rays L2 detected by the detection element 51m at the time of the second measurement are different from the characteristic X-rays L1 detected by the detection element 51m at the time of the first measurement. In other words, the characteristic X-rays L2 are characteristic X-rays emitted not from the position Am1 of the sample but from the position Am2, which has been slightly displaced from the position Am1. With this, it is possible to differentiate the wavelength (energy) of the characteristic X-rays measured at each of the detection elements 51 between the first measurement before moving the slit 30 and the second measurement after moving the slit 30.

In other words, the slit movement amount ΔD is set to an amount such that the wavelength measured by each of the detection elements 51 at the time of the first measurement and the wavelength measured by each of the detection elements 51 at the time of the second measurement differ in value.

Figure 4:
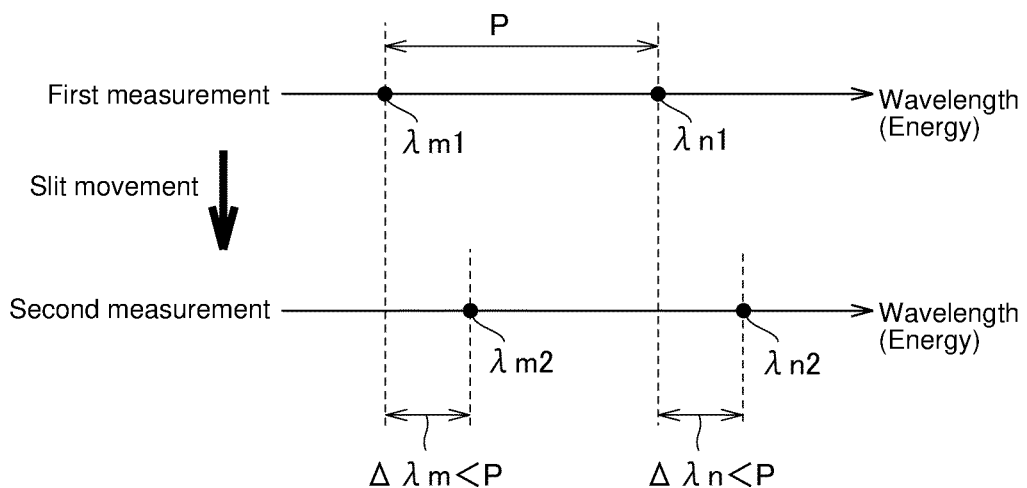
FIG. 4 is a diagram showing the relation between the wavelengths (energies) measured by the two detection elements arranged adjacently at the first measurement and the second measurement.

FIG. 4 is a diagram showing the relation between the wavelengths (energies) measured by the two detection elements 51*m* and 51*n* arranged adjacently at the time of the first measurement and at the time of the second measurement.

When the wavelengths measured by the detection element 51*m* and the detection element 51*n* in the first measurement are "λm1" and "λn1," respectively, the difference between the wavelength λm1 and the wavelength λn1 (=|λm1−λn1|) becomes a first measurement pitch P (resolution). In other words, at the time of the first measurement, the intensity of the wavelength between the wavelength λm and the wavelength λn cannot be measured.

When the wavelength measured by the detection element 51*m* in the second measurement is "λ m2," the difference Δλ m (=|λ m1−λ m2|) between the wavelength λ m1 and the wavelength λ m2 is less than the first measurement pitch P. To improve the peak fitting accuracy more appropriately, the difference Δλm is preferably about one-eighth or more and one-half or less (P/8≤Δλm≤P/2) of the first measurement pitch P.

Similarly, when the wavelength measured by the detection element 51*n* in the second measurement is "λn2," the difference Δλn (=|λn1−λn2|) between the wavelength λn1 and the wavelength λn2 is less than the first measurement pitch P. To improve the peak fitting accuracy more appropriately, it is desirable that P/8≤Δλn≤P/2.

The slit movement amount ΔD is set to an amount such that the wavelength measured by the detection element 51 has the relation shown in FIG. 4.

Then, the controller 70 generates a spectrum of characteristic X-rays to be used for the analysis of the sample S by synthesizing the first measurement result and the second measurement result.

Figure 5:
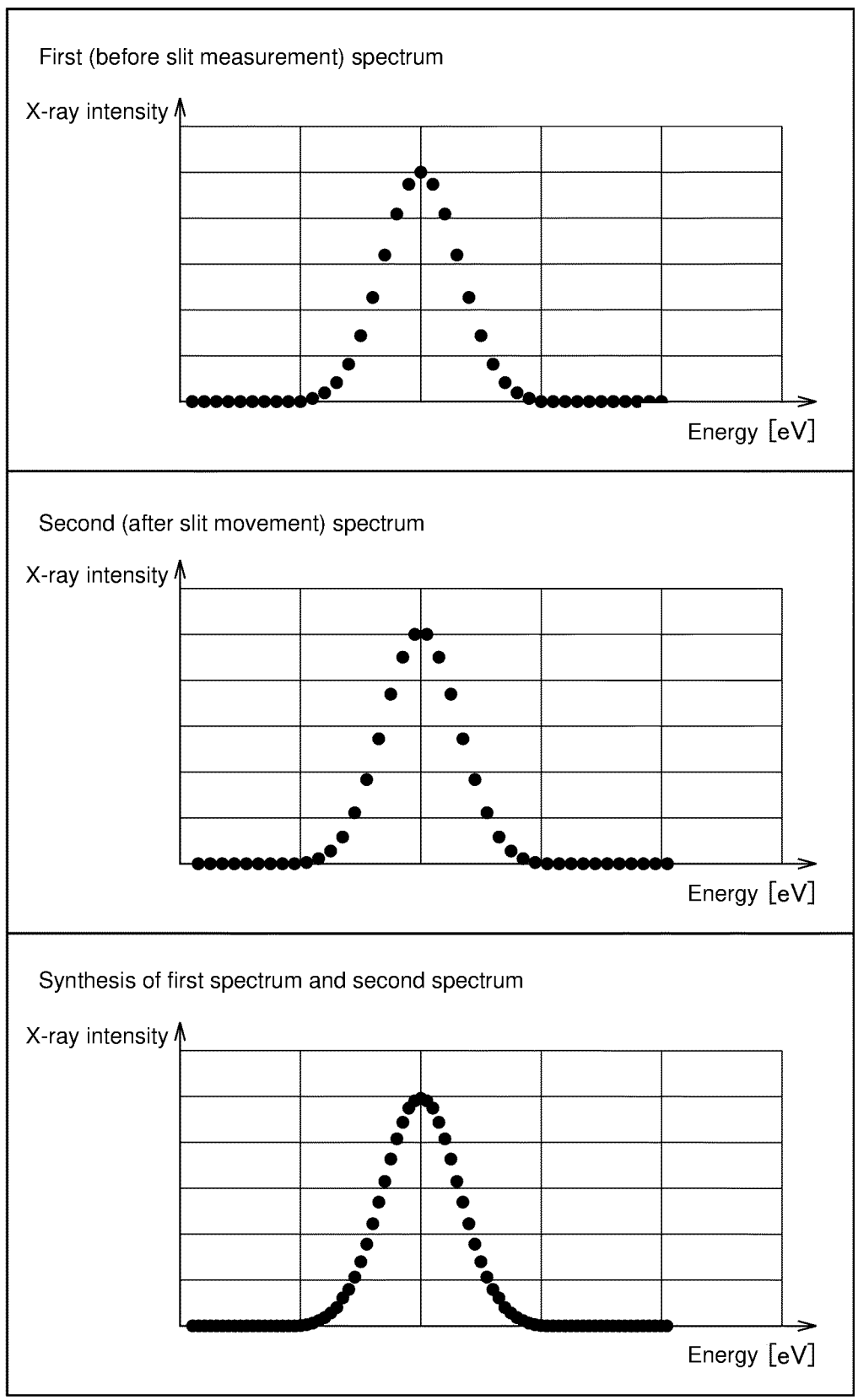
FIG. 5 is a schematic diagram showing the characteristic X-ray spectrum acquired from the first measurement result, the characteristic X-ray spectrum acquired from the second measurement result, and the synthesized spectrum of these spectra.

FIG. 5 is a schematic diagram showing the characteristic X-ray spectrum acquired from the first measurement result, the characteristic X-ray spectrum acquired from the second measurement result, and the synthesized spectrum of these spectra.

The wavelength measurement pitch itself is almost the same between the first measurement and the second measurement, but the wavelength measured by each of the detection elements 51 differs from each other. For this reason, by synthesizing the characteristic X-ray spectrum acquired from the first measurement result and the characteristic X-ray spectrum acquired from the second measurement result, the wavelength that could not be measured in the first measurement can be interpolated by the second measurement, thereby generating a more precise spectral waveform. In this way, the analysis accuracy of the sample S can be improved without downsizing the detection element 51.

Figure 6:
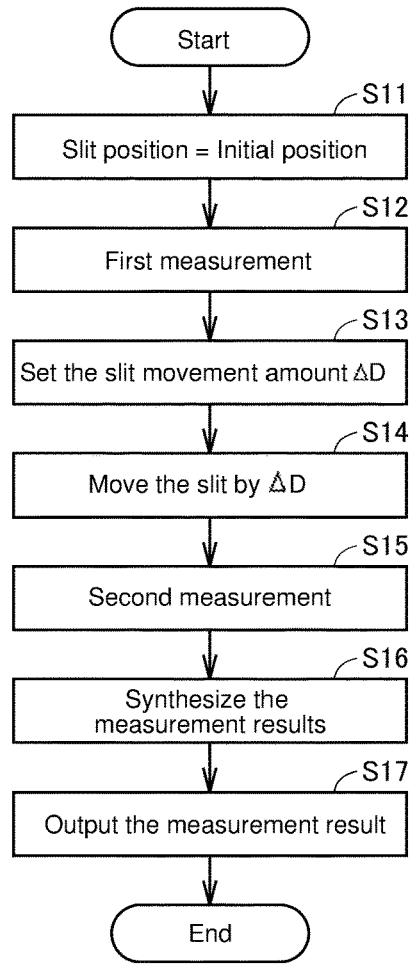
FIG. 6 is a flowchart showing one example of a processing procedure executed by the controller when analyzing a sample.

FIG. 6 is a flowchart showing one example of a processing procedure to be executed by the controller 70 when analyzing a sample. This flowchart is initiated, for example, when the user performs the analysis start operation in a state in which the sample S is held on the holder 10.

Initially, the controller 70 controls the actuator 60 to set the slit 30 to an initial position (Step S11) and then performs a first measurement (Step S12). Specifically, the controller 70 causes the excitation source 20 to emit excitation light toward the sample S in the state in which the slit 30 is in the initial position and makes the line detector 50 measure the characteristic X-rays generated by the sample S. The controller 70 causes a memory to store the result as a first measurement result.

After completion of the first measurement, the controller 70 sets a slit movement amount ΔD (Step S13). The slit movement amount ΔD may be a predetermined fixed value or a variable value that can be adjusted by the user. In either case, the slit movement amount ΔD is set to an amount such that the wavelength measured by each detection element 51 at the time of the first measurement and the wavelength measured by each detection element 51 at the time of the second measurement are different from each other, as described above.

Next, the controller 70 controls the actuator 60 to move the slit 30 by the slit movement amount ΔD in the slit movement direction (Step S14) and performs a second measurement (Step S15). Specifically, the controller 70 irradiates excitation light from the excitation source 20 toward the sample S in the state in which the slit 30 is in a position moved from the initial position by the slit movement amount ΔD in the slit movement direction and makes the line detector 50 measure the characteristic X-rays generated by the sample S. The controller 70 makes the memory store the result as a second measurement result.

Next, the controller 70 synthesizes the characteristic X-ray spectrum acquired from the first measurement result and the characteristic X-ray spectrum acquired from the second measurement result (Step S16).

Subsequently, the controller 70 causes the synthesized characteristic X-ray spectrum to be output (Step S17). For example, the controller 70 makes the display 80 display the synthesized characteristic X-ray spectrum. The user can perform the analysis of the sample S by viewing the synthesized spectrum displayed on the display 80.

As described above, the X-ray analyzer 1 according to this embodiment is equipped with an actuator 60 for moving the slit 30, which is positioned between the sample S and the analyzing crystal 40. The controller 70 causes the slit 30 to move by a predetermined amount ΔD in a direction intersecting a propagation direction of the characteristic X-rays passing through the slit when performing the sample analysis. With this, it is possible to differentiate the wavelength (energy) of the characteristic X-rays measured at each detection element 51 before and after moving the slit 30. As a result, the analysis accuracy of the sample S can be improved without downsizing the detection element 51.

Furthermore, in this embodiment, the characteristic X-ray spectrum is generated by synthesizing the results of the first-time measurement (first measurement) before the movement of the slit 30) and the results of the second-time measurement (second measurement) after the movement of the slit 30. With this, it is possible to detect the characteristic X-rays more precisely with a wavelength pitch finer than the first measurement pitch before the movement of the slit 30.

Further, the analyzing crystal 40 and the line detector 50 in this embodiment are fixed without being moved mechanically. Therefore, it is possible to stabilize the energy position and the intensity of the characteristic X-rays detected by the line detector 50.

<Modification 1>

It may be configured such that a mode for fixing the position of the slit 30 (hereinafter referred to as "slit fixed mode") is added to the sample analysis mode by the X-ray analyzer 1, in addition to the mode accompanied by the movement of the slit 30 as described in the embodiment above (hereinafter referred to as "slit movement mode"), so that the sample analysis mode can be selected according to the request of the user.

Figure 7:
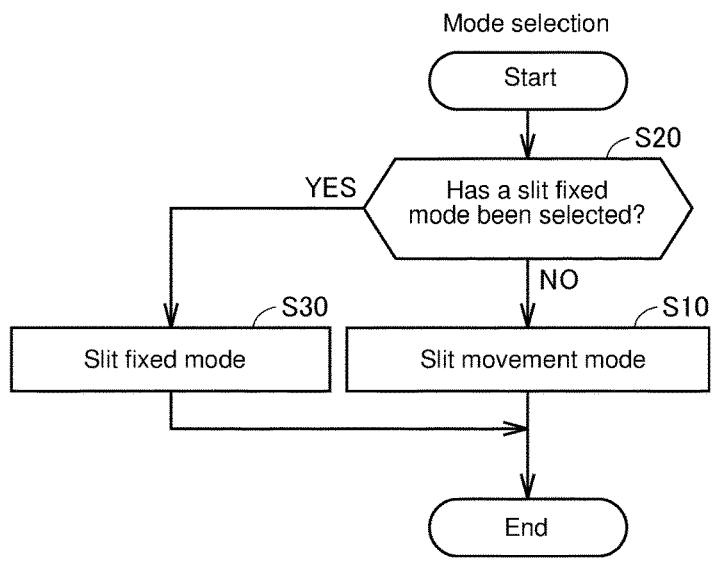
FIG. 7 is a flowchart (Part 1) showing one example of a processing procedure executed by the controller when selecting a sample analysis mode.

FIG. 7 is a flowchart showing one example of the processing procedure performed when the controller 70 selects the sample analysis mode according to Modification 1.

Initially, the controller 70 determines whether the user has performed an operation to select the slit fixed mode (Step S20).

When the user has performed an operation to select the slit fixed mode (YES in Step S20), the controller 70 sets the sample analysis mode to the slit fixed mode (Step S30). In the slit fixed mode, the slit 30 is fixed in its initial position without being moved, and a characteristic X-ray spectrum is generated from a single measurement result. Therefore, the analysis time can be shortened as compared with the case in which the first measurement is followed by the movement of the slit 30 and the second measurement (slit movement mode). Thus, in the case where it is not required to have so fine resolution, the user can shorten the analysis time by selecting the fixed slit mode.

On the other hand, in the case where the user has not performed an operation to select the slit fixed mode (NO in Step S20), the controller 70 sets the sample analysis mode to the slit movement mode (Step S10). In the slit movement mode, as described in the above embodiment, the slit 30 is moved after the first measurement, and then the second measurement is performed. For this reason, although the analysis time is longer than that in the fixed slit mode, a high-resolution spectrum can be acquired, which improves the analysis accuracy of the sample S.

As described above, it may be configured to switch whether the sample analysis mode by the X-ray analyzer 1 is performed in the slit movement mode or the slit fixed mode, depending on the request of the user. This can improve the user's convenience.

<Modification 2>

In the above-described embodiment, the slit 30 is moved stepwise after the first measurement, and then the second measurement is performed. However, the method of moving the slit 30 is not necessarily limited to the stepwise manner but may be a continuous manner. For example, it may be configured such that the slit 30 is moved continuously within a predetermined range, a plurality of measurements are performed at a plurality of different times during the movement of the slit 30, and a spectrum is generated by synthesizing the plurality of measurement results.

Figure 8:
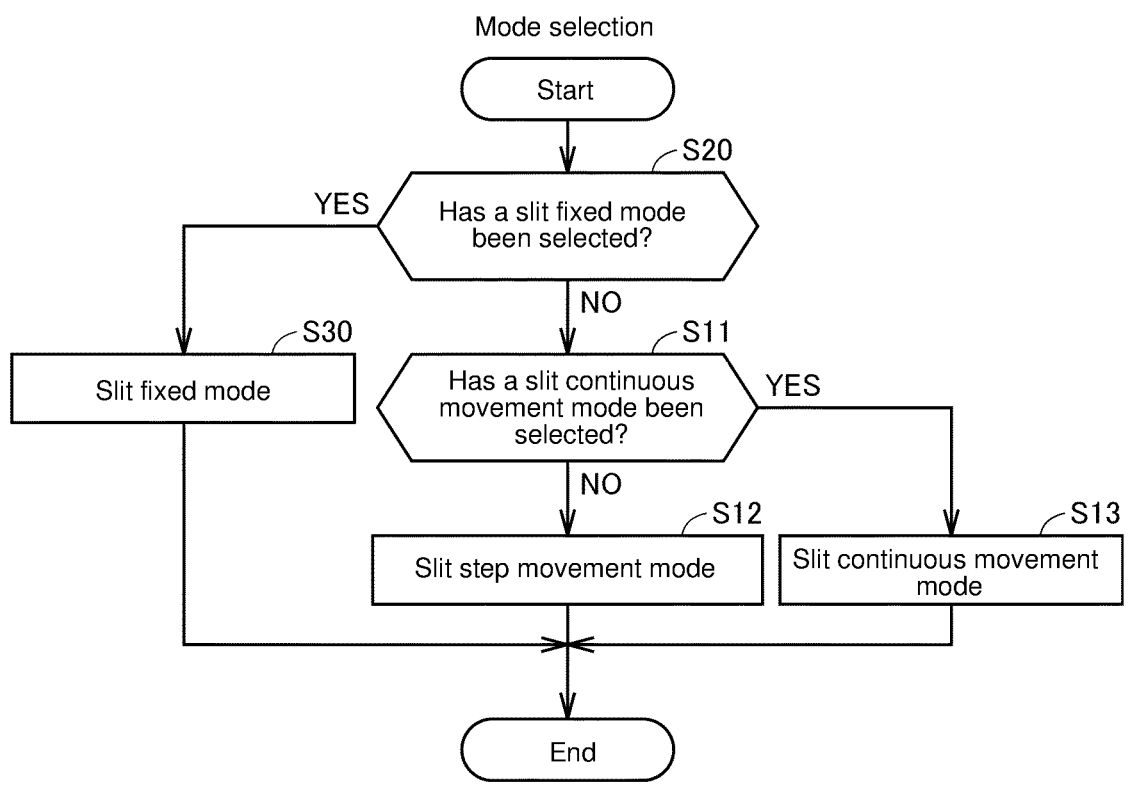
FIG. 8 is a flowchart (Part 2) showing one example of a processing procedure executed by the controller when selecting a sample analysis mode.

FIG. 8 is a flowchart showing one example of the processing procedure performed when the controller 70 sets the sample analysis mode according to Modification 2. In the flowchart shown in FIG. 8, Steps S11 to S13 are added in place of Step S10 of the flowchart shown in FIG. 7. The other steps in FIG. 8 (steps assigned the same reference symbol as the steps shown in FIG. 6) have already been described, so the detailed description will not be repeated here.

In the case where the user has performed the operation to select the slit fixed mode (YES in Step S20), the controller 70 sets the sample analysis mode to the slit fixed mode (Step S30).

On the other hand, in the case where the user has not performed the operation to select the slit fixed mode (NO in Step S20), the controller 70 determines whether the user has performed the operation to select the slit continuous movement mode (Step S11).

In the case where the user has performed the operation to select the slit continuous movement mode (YES in Step S11), the controller 70 sets the sample analysis mode to the slit continuous movement mode (Step S13). In the slit continuous movement mode, as described above, for example, the controller 70 causes the slit 30 to move continuously within a predetermined range and performs a plurality of measurements at a plurality of different times during the movement of the slit 30 to generate a synthesized spectrum of the plurality of measurement results. With this, it is possible to generate a finer resolution spectrum.

In the case where the user has not performed the operation to select the slit continuous movement mode (NO in step S11), the controller 70 sets the sample analysis mode to the slit step movement mode (Step S12). In the slit step movement mode, as described in the above-described embodiment, the slit 30 is moved stepwise after the first measurement, followed by the second measurement.

As described above, the sample analysis mode by the X-ray analyzer 1 may be switched according to the request of the user between the slit step movement mode for moving the slit 30 and the slit continuous movement mode for moving the slit 30. This can improve the user's convenience.

Aspects

It should be understood by those skilled in the art that the above-described embodiments and modifications thereof are specific examples of the following aspects.

(Item 1)

An X-ray analyzer according to one aspect of the present disclosure includes;
- an excitation source configured to irradiate a sample with an excitation beam;
- an analyzing crystal configured to diffract characteristic X-rays emitted from the sample irradiated with the excitation beam for each wavelength;
- a line detector having a plurality of detection elements each arranged to detect an intensity of each of a plurality of wavelengths diffracted by the analyzing crystal;
- a slit arranged between the sample and the analyzing crystal;
- a drive unit configured to move the slit in a direction intersecting a propagation direction of the characteristic X-rays passing through the slit; and
- a controller,
- wherein the controller analyzes the sample using a first measurement result which is a measurement result of the line detector when the slit is in a first position and a second measurement result which is a measurement result of the line detector when the slit has been moved from the first position by the driving device and is in a second position.

According to the X-ray analyzer as recited in the above-described Item 1, by moving the slit in a direction intersecting a propagation direction of the characteristic X-rays passing through the slit by a driving device when analyzing a sample, it is possible to differentiate the wavelength measured by the line detector when the slit is in the first position and the wavelength measured by the line detector when the slit is moved to the second position, which is different from the first position. Then, the sample is analyzed using the first measurement result when the slit is in the first position and the second measurement result when the slit has been moved to the second position. With this, the wavelength that could not be measured in the first measurement can be interpolated by the second measurement. As a result, the analysis accuracy of the sample can be improved without downsizing the detection element.

(Item 2)

In the X-ray analyzer as recited in the above-described Item 1, it may be configured such that the controller generates a spectrum of the characteristic X-rays to be used for an analysis of the sample by synthesizing the first measurement result and the second measurement result.

According to the X-ray analyzer as recited in the above-described Item 2, by synthesizing the first measurement result and the second measurement result, a wavelength that could not be measured in the first measurement can be interpolated by the wavelength measured in the second measurement, which makes it possible to generate a more precise spectral waveform.

(Item 3)

In the X-ray analyzer as recited in the above-described Item 1, it may be configured such that a movement amount of the slit from the first position to the second position is set to an amount such that a wavelength measured at a time of the first measurement and a wavelength measured at a time of the second measurement differ in value from each other.

According to the X-ray analyzer as recited in the above-described Item 3, the slit movement amount is set to an amount such that the wavelength measured during the first measurement and the wavelength measured during the second measurement are different in value from each other. Therefore, a wavelength that could not be measured in the first measurement can be interpolated more reliably with the wavelength measured in the second measurement.

(Item 4)

In the X-ray analyzer as recited in the above-described Item 3, it may be configured such that the plurality of detection elements includes a first detection element and a second detection element arranged adjacently, and when a wavelength measured by the first detection element at the time of the first measurement and a wavelength measured by the second detection element at the time of the second measurement are defined as a first wavelength and a second wavelength, respectively, a difference between the first wavelength and the second wavelength is defined as a measurement pitch, and a wavelength measured by the first detection element at the time of the second measurement is defined a third wavelength, a difference between the first wavelength and the third wavelength is less than the measurement pitch.

According to the X-ray analyzer as recited in the above-described Item 4, it is possible to differentiate the wavelength measured at the time of the first measurement and the wavelength measured at the time of the second measurement by making the difference between the wavelength (first wavelength) measured at the time of the first measurement and the wavelength (third wavelength) measured at the time of the second measurement to be less than the measurement pitch.

(Item 5)

In the X-ray analyzer as recited in the above-described Item 1, it may be configured such that a movement of the slit by the drive unit is accompanied and a fixed mode in which the slit is fixed in position, and the controller switches whether the sample analysis mode is the movement mode or the fixed mode according to a request of the user.

According to the X-ray analyzer as recited in the above-described Item 5, it is possible to switch the sample analysis mode between the movement mode and the fixed mode, according to the request of the user. Therefore, the user's convenience can be improved.

(Item 6)

In the X-ray analyzer as recited in the above-described Item 5, it may be configured such that the movement mode includes a step movement mode in which the slit is moved stepwise and a continuous movement mode in which the slit is moved continuously, and the controller switches whether the sample analysis mode is the step movement mode, the continuous movement mode, or the fixed mode, depending on the request of the user.

According to the X-ray analyzer as recited in the above-described Item 6, the sample analysis mode can be switched between the step movement mode, the continuous movement mode, and the fixed mode according to the request of the user. Therefore, the convenience of the user can be improved.

While illustrative embodiments of the present disclosure have been described herein, the present disclosure is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:

1. An X-ray analyzer comprising:

an excitation source configured to irradiate a sample with an excitation beam;

an analyzing crystal configured to diffract characteristic X-rays emitted from the sample irradiated with the excitation beam;

a line detector having a plurality of detection elements each arranged to detect an intensity of each of a corresponding plurality of wavelengths diffracted by the analyzing crystal;

a slit arranged between the sample and the analyzing crystal;

a drive unit configured to move the slit in a direction intersecting a propagation direction of the characteristic X-rays passing through the slit; and a controller, wherein the controller analyzes the sample using a first measurement result which is a measurement result of the line detector when the slit is in a first position and a second measurement result which is a measurement result of the line detector when the slit has been moved from the first position by the driving device and is in a second position.

2. The X-ray analyzer as recited in claim 1, wherein the controller generates a spectrum of the characteristic X-rays to be used for an analysis of the sample by synthesizing the first measurement result and the second measurement result.

3. The X-ray analyzer as recited in claim 1, wherein the plurality of detection elements includes a first detection element, and wherein a movement amount of the slit from the first position to the second position is set to an amount such that a wavelength measured by the first detection element at a time of the first measurement and a wavelength measured by the first detection element at a time of the second measurement differ in value from each other.

4. The X-ray analyzer as recited in claim 3,
wherein the plurality of detection elements includes a second detection element arranged adjacently to the first detection element, and
wherein when a wavelength measured by the first detection element at the time of the first measurement and a wavelength measured by the second detection element at the time of the first measurement are defined as a first wavelength and a second wavelength, respectively, a difference between the first wavelength and the second wavelength is defined as a measurement pitch, and a wavelength measured by the first detection element at the time of the second measurement is defined a third wavelength,
a difference between the first wavelength and the third wavelength is less than the measurement pitch.

5. The X-ray analyzer as recited in claim 1,
wherein a sample analysis mode by the controller includes a movement mode in which a movement of the slit by the drive unit is accompanied and a fixed mode in which the slit is fixed in position, and
wherein the controller switches whether the sample analysis mode is the movement mode or the fixed mode according to a request of the user.

6. The X-ray analyzer as recited in claim 5,
wherein the movement mode includes a step movement mode in which the slit is moved stepwise and a continuous movement mode in which the slit is moved continuously, and
wherein the controller switches whether the sample analysis mode is the step movement mode, the continuous movement mode, or the fixed mode, depending on the request of the user.

* * * * *